(12) United States Patent
Yamazaki

(10) Patent No.: US 12,311,996 B2
(45) Date of Patent: May 27, 2025

(54) STEERING WHEEL

(71) Applicant: HONDA MOTOR CO., LTD., Tokyo (JP)

(72) Inventor: Ryo Yamazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/536,318

(22) Filed: Dec. 12, 2023

(65) Prior Publication Data

US 2024/0208562 A1     Jun. 27, 2024

(30) Foreign Application Priority Data

Dec. 27, 2022   (JP) .................. 2022-210146

(51) Int. Cl.
    *B62D 1/04*     (2006.01)
    *B62D 1/06*     (2006.01)
    *B62D 1/08*     (2006.01)

(52) U.S. Cl.
    CPC ....... *B62D 1/08* (2013.01); *B62D 1/06* (2013.01)

(58) Field of Classification Search
    CPC ............... B62D 1/04; B62D 1/06; B62D 1/08
    USPC ........................................................ D12/175
    See application file for complete search history.

(56) References Cited

U.S. PATENT DOCUMENTS

| | | | |
|---|---|---|---|
| 1,492,277 A * | 4/1924 | Thompson | B62D 1/08 74/557 |
| 4,161,892 A | 7/1979 | Conterno | |
| D406,804 S * | 3/1999 | Sacco | D12/175 |
| 6,224,093 B1 | 5/2001 | Ochiai et al. | |
| 7,004,048 B2 * | 2/2006 | Kobayashi | B62D 1/166 74/552 |
| 10,202,138 B2 * | 2/2019 | Shimizu | B62D 1/08 |

(Continued)

FOREIGN PATENT DOCUMENTS

| | | |
|---|---|---|
| CN | 211391437 | 9/2020 |
| CN | 215475328 | 1/2022 |

(Continued)

OTHER PUBLICATIONS

Japanese Office Action for Japanese Patent Application No. 2022-210146 mailed Oct. 1, 2024.

*Primary Examiner* — Adam D Rogers
(74) *Attorney, Agent, or Firm* — Amin, Turocy & Watson, LLP

(57) ABSTRACT

A steering wheel includes: a rim part having a non-annular shape; and a spoke part. The spoke part includes an inflection section, an upper inclination surface, and a lower inclination surface. The inflection section extends along an extension direction of the spoke part and faces a driver's side. The upper inclination surface extends toward an upper side from the inflection section and is curved to a vehicle forward side. The lower inclination surface extends toward a lower side from the inflection section and is curved to the vehicle forward side. The upper inclination surface is set such that a radius of curvature of a portion curved to the vehicle forward side is larger than a radius of curvature of a portion curved to the vehicle forward side of the lower inclination surface. The rim part includes a protrusion portion protruding upward from a position adjacent to the upper inclination surface in a steering neutral state.

8 Claims, 3 Drawing Sheets

(56) References Cited

U.S. PATENT DOCUMENTS

| | | | |
|---|---|---|---|
| D931,167 S * | 9/2021 | Kim | D12/175 |
| 11,565,737 B1 * | 1/2023 | Becker | B62D 1/06 |
| 11,878,731 B2 * | 1/2024 | Kato | B62D 1/06 |
| 11,938,995 B2 * | 3/2024 | Hada | B62D 1/06 |
| 2006/0162485 A1 | 7/2006 | Leng et al. | |
| 2007/0295152 A1 * | 12/2007 | Fittipaldi | G05G 1/06 |
| | | | 74/552 |
| 2019/0283777 A1 | 9/2019 | Mimura et al. | |
| 2023/0082806 A1 | 3/2023 | Hada et al. | |
| 2024/0208561 A1 * | 6/2024 | Yamazaki | B62D 1/08 |

FOREIGN PATENT DOCUMENTS

| | | |
|---|---|---|
| GB | 481381 A * | 3/1938 |
| JP | 53-061561 | 5/1978 |
| JP | 11-059434 | 3/1999 |
| JP | 2007-069717 | 3/2007 |
| WO | 2018/078740 | 5/2018 |
| WO | 2021/124678 | 6/2021 |
| WO | 2022/230591 | 11/2022 |

\* cited by examiner

STEERING WHEEL

CROSS-REFERENCE TO RELATED APPLICATION

Priority is claimed on Japanese Patent Application No. 2022-210146, filed on Dec. 27, 2022, the contents of which are incorporated herein by reference.

BACKGROUND

Field of the Invention

The present invention relates to a steering wheel of a vehicle.

Background

A steering wheel of a general vehicle includes: a hub part supported by a steering shaft; a rim part having an annular shape and gripped by a driver; and a spoke part connecting the hub part to the rim part. Recently, steering wheels including a rim part having a non-annular shape have been developed from the viewpoint of ensuring forward visibility or the like (for example, refer to Japanese Unexamined Patent Application, First Publication No. 2007-69717).

As a steering wheel of this type, a steering wheel in which the rim part is formed in a substantially semi-circular shape or a substantially semi-elliptical shape that is laterally elongated, and a region that becomes an upper section of the rim part is not present in a steering neutral state is known. In this steering wheel, the spoke part extends along a direction that becomes a vehicle width direction in the steering neutral state, and an end in the extension direction of the spoke part is connected to each of right and left upper end regions of the rim part.

In the case of this steering wheel, since a region (a portion arranged above the hub part) that becomes the upper section in the steering neutral state is not present in the rim part, the rim part does not block the sight of the driver when looking forward, and thereby, forward visibility is ensured.

SUMMARY

However, in the steering device of the related art described above, when the driver grips an upper portion of right and left side edges of the rim part in the steering neutral state, since the spoke part is present at a position where the driver's thumb is placed, in many cases, it is necessary for the driver to grip the spoke part at a position which is unnatural for driver's fingers.

Further, in the steering device of the related art described above, the rim part is not present above an intersection region with the right and left spoke parts of the rim part in the steering neutral state. Therefore, when the driver grips the periphery of the intersection region with the right and left spoke parts of the rim part and performs a rotation operation of the rim part, the driver is forced to perform a careful rotation operation such that a position displacement of the gripped portion does not occur. That is, when the driver performs the rotation operation of the rim part and intends to push and rotate the rim part upward, the driver's hand can be easily displaced from an end of the rim part toward a pushing-rotating direction, and the driver is forced to perform a careful rotation operation such that this displacement in the pushing-rotating direction does not occur.

An aspect of the present invention provides a steering wheel capable of obtaining reasonable natural gripping of a rim part by a driver and a good rotation operation while ensuring good forward visibility of the driver in a steering neutral state. The aspect of the present invention further improves traffic safety and contributes to the development of a sustainable transport system.

A steering wheel according to an aspect of the present invention includes: a rim part having a non-annular shape in which a region that becomes an upper section in a steering neutral state is not continuous; and a spoke part extending along a direction that becomes a vehicle width direction in the steering neutral state and having an outer end in the vehicle width direction that is connected to the rim part, wherein the spoke part includes: an inflection section extending along an extension direction of the spoke part and facing a driver's side; an upper inclination surface extending toward an upper side in the steering neutral state from the inflection section and curved to a vehicle forward side; and a lower inclination surface extending toward a lower side in the steering neutral state from the inflection section and curved to the vehicle forward side, the upper inclination surface is set such that a radius of curvature of a portion curved to the vehicle forward side is larger than a radius of curvature of a portion curved to the vehicle forward side of the lower inclination surface, and the rim part includes a protrusion portion protruding toward an upper side from a position adjacent to the upper inclination surface in the steering neutral state.

When the steering wheel of the configuration described above is in the steering neutral state, the non-continuous section at the upper side of the rim part is located at a forward position of the sight of the driver. Therefore, the steering wheel does not block the forward sight of the driver, and the driver's visibility is improved.

Further, the driver can press a region of the thumb of the hand from the root to the vicinity of a first joint against the upper inclination surface of the spoke part and, in that state, grip an outer portion of an intersection region with the spoke part of the rim part by another finger. Therefore, it becomes possible for the driver to stably grip the steering wheel in a natural state that is not subject to an excessive force on the hand.

Further, when the driver grips the steering wheel in the state where the region of the thumb from the root to the vicinity of the first joint is pressed against the upper inclination surface as described above, the protrusion portion is located just above the gripped portion. Therefore, in this state, when the driver rotates the rim part in one direction from the steering neutral state, the driver's hand at a side of pushing and rotating the rim part upward is not easily displaced in the rotation operation direction.

The upper inclination surface may include: a main region extending linearly along the extension direction of the spoke part in the steering neutral state; and a connection region curved upward from an end on the rim part side of the main region in the steering neutral state and continuing to the protrusion portion.

In this case, in the state where the driver presses the lower region of his/her thumb (that is, the region of the thumb from the base to the first joint) against the main region, the driver can simultaneously press an inner side surface of the thumb continuously against the curved connection region. Therefore, a wide region of the driver's thumb is stably in contact with the upper inclination surface, the stability of gripping of the steering wheel is enhanced, and gripping feeling of the driver is also improved.

The protrusion portion may include a flat inner inclination surface having at least a portion facing inward in the vehicle width direction and to the driver's side in a region that becomes an inside in the vehicle width direction in the steering neutral state.

In this case, when the driver directly grips an outer circumferential surface of the protrusion portion, the driver can press the belly or the root of the thumb against the flat inner inclination surface. Therefore, when the driver directly grips the protrusion portion, the driver can stably grip the protrusion portion. Further, by pressing the belly of the thumb against the inner inclination surface, when the rim part is rotated in one direction, the driver can strongly prevent the gripping portion of the driver's hand from exiting in the rotation operation direction by the force of the thumb.

The inner inclination surface may continue to the curved connection region of the spoke part.

In this case, when the driver moves the grip position of the rim part between an outer circumferential position of the protrusion portion and an extension position (intersection region) of the spoke part in the rim part, by slightly displacing the pushing position of the thumb between the inner inclination surface and the upper inclination surface (connection region), the grip position can be moved smoothly without interruption.

A surface facing upward in the steering neutral state of the protrusion portion may be a flat surface.

In this case, when the driver directly grips the protrusion portion, a portion of an index finger or a middle finger can be stably placed on the flat surface at the upper section of the protrusion portion. In this way, by placing the portion of the index finger or the middle finger on the flat surface at the upper section of the protrusion portion, placement of the finger on the protrusion portion is improved. Accordingly, when the present configuration is employed, the grip state when gripping the protrusion portion becomes stable.

Part of an outer circumferential surface of the protrusion portion may project further outward than a rotation trajectory of an outer circumferential surface of the rim part located on an extension in the extension direction of the spoke part.

In this case, when pressing the region of the thumb from the root to the vicinity of the first joint against the upper inclination surface of the spoke part and, in that state, gripping the outer portion of the intersection region with the spoke part of the rim part by another finger, a section projecting further outward of the outer circumferential surface of the protrusion portion than the rotation trajectory of the outer circumferential surface of the rim part is located at the upper side of the other finger. Therefore, when the driver performs the rotation operation of the steering wheel in this state, the finger other than the thumb of the driver at a side of pushing and rotating the steering wheel upward is caught by the projection section at the outside of the outer circumferential surface of the protrusion portion, and displacement of the grip position is prevented.

When the driver presses the region of the thumb from the root to the vicinity of the first joint against the upper inclination surface of the spoke part and grips the rim part, since the grip position of the thumb faces obliquely upward and is fixed, the fingers other than the thumb are located below the section projecting outward of the outer circumferential surface of the protrusion portion. Accordingly, the driver does not grip the section projecting outward of the outer circumferential surface of the protrusion portion in an unnatural wrist attitude and does not feel uncomfortable at the time of gripping.

Part of an outer circumferential surface of the protrusion portion may project further inward than a rotation trajectory of an inner circumferential surface of the rim part located on an extension in the extension direction of the spoke part.

In this case, when pressing the region of the thumb from the root to the vicinity of the first joint against the upper inclination surface of the spoke part and, in that state, gripping the outer portion of the intersection region with the spoke part of the rim part by another finger, a section projecting further inward of the outer circumferential surface of the protrusion portion than the rotation trajectory of the inner circumferential surface of the rim part is located at the upper side of the root of the thumb. Therefore, when the driver performs the rotation operation of the steering wheel in this state, the root of the thumb of the driver at a side of pushing and rotating the steering wheel upward is caught by the projection section at the inside of the outer circumferential surface of the protrusion portion, and displacement of the grip position is prevented.

In the protrusion portion, a width in the vehicle width direction in the steering neutral state may widen toward an end in a protrusion direction.

In this case, when pressing the region of the thumb from the root to the vicinity of the first joint against the upper inclination surface of the spoke part and, in that state, gripping the outer portion of the intersection region with the spoke part of the rim part by another finger, a side to which the width of the protrusion portion is increased is located at the upper side of the root of the thumb and the other finger. At this time, since the width of the base side of the protrusion portion is relatively narrow, gripping of the rim part in a state where the thumb is pressed against the upper inclination surface is not prevented. Further, since the width of the protrusion portion is increased toward the protrusion end side, when the driver performs the rotation operation of the steering wheel, the position displacement of the driver's hand at a side of pushing and rotating the steering wheel upward can be further reliably prevented by the protrusion portion.

In the steering wheel according to an aspect of the present invention, the spoke part includes the upper inclination surface as described above, and the rim part having a non-annular shape includes a protrusion portion protruding upward from a position adjacent to the upper inclination surface in the steering neutral state. Therefore, when the steering wheel according to the aspect of the present invention is employed, it is possible to obtain reasonable natural gripping of the rim part by the driver and a good rotation operation while ensuring good forward visibility of the driver in the steering neutral state.

DESCRIPTION OF EMBODIMENTS

Figure 1:
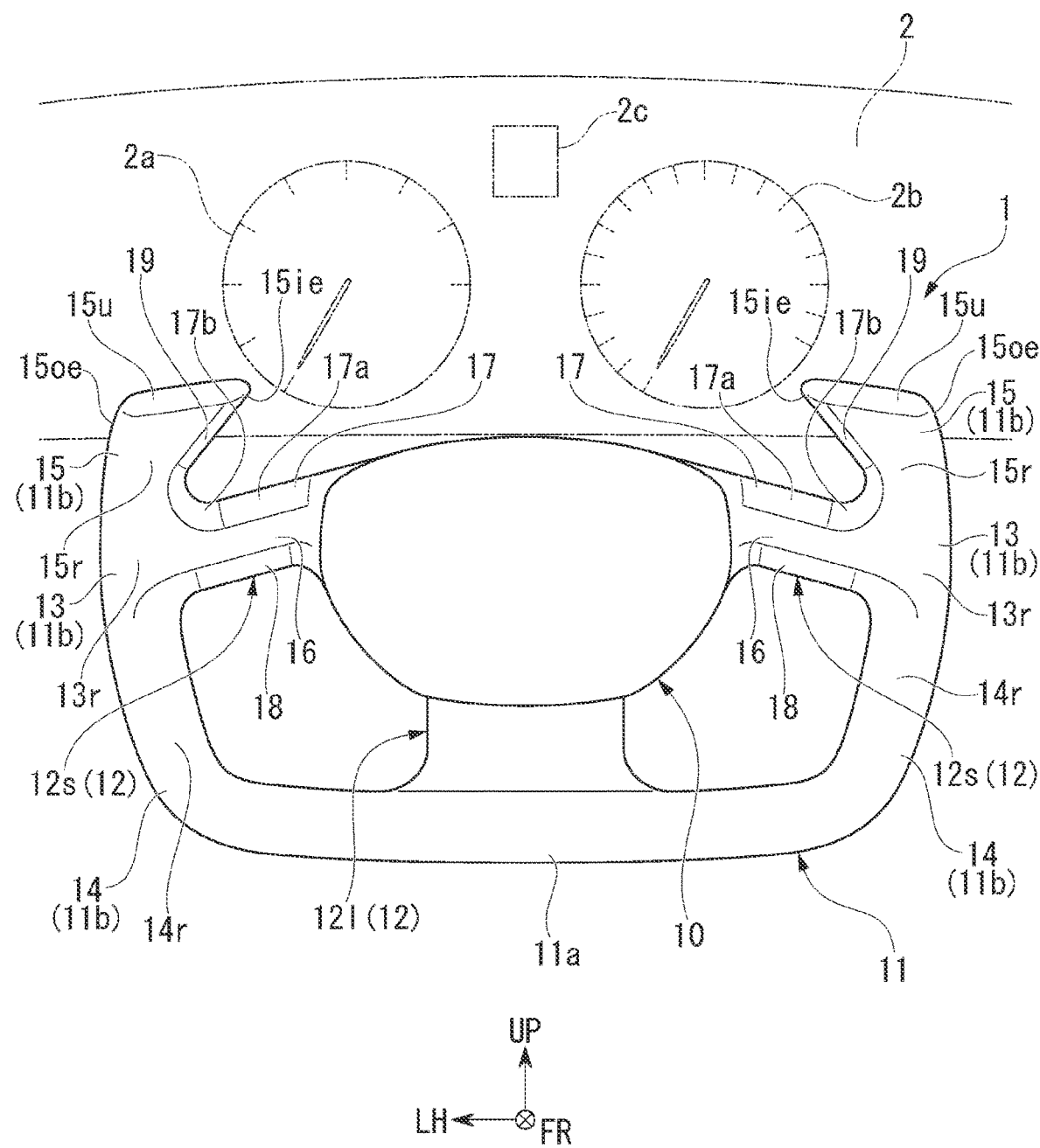
FIG. 1 is a front view of a steering wheel of an embodiment arranged in front of a driver's seat.

Hereinafter, embodiments of the present invention will be described with reference to the drawings. In appropriate positions in the drawings, an arrow FR that indicates a vehicle forward direction, an arrow UP that indicates a vehicle upward direction, and an arrow LH that indicates a vehicle leftward direction are shown.

<Steering Wheel Configuration>

FIG. 1 is a front view of a steering wheel 1 of the present embodiment arranged in front of a driver's seat of a vehicle.

The steering wheel 1 includes a hub part 10 supported by a steering shaft (not shown), a rim part 11 having a non-annular shape and gripped by a driver, and three spoke parts 12 connecting the hub part 10 to the rim part 11. An instrument panel 2 is arranged on a vehicle forward side of the steering wheel 1. Display portions 2a to 2c displaying vehicle information such as a vehicle speed and other information are arranged to face a direction of the driver (vehicle rearward side) on the instrument panel 2.

The hub part 10 is arranged so as to face the driver seated in the driver's seat. In the present embodiment, the hub part 10 is formed in a shape in which a front view is a substantially elliptical shape that is laterally elongated at the time of a steering neutral state. The hub part 10 includes a horn (not shown) and an air bag device (not shown).

The "steering neutral state" means a steering state (rotation position of the steering wheel 1) when a steering wheel of the vehicle is directed in a straight-running direction. Further, in the following description, the terms "upper", "lower", "vehicle width direction", and the like relating to the steering wheel 1 mean a direction when the steering wheel 1 is in the steering neutral state unless otherwise specified.

The rim part 11 has a non-annular shape in which a region that becomes an upper section in the steering neutral state is not continuous. The rim part 11 includes: a lower side portion 11a extending along the vehicle width direction below the hub part 10; and a pair of lateral side portions 11b extending upward from both ends in the vehicle width direction of the lower side portion 11a. An end on both sides of the lower side portion 11a is curved upward in an arc shape and continues to a lower end of each lateral side portion 11b.

The spoke part 12 includes: a pair of side spoke portions 12s extending along the vehicle width direction from the hub part 10 in the steering neutral state; and a lower spoke portion 12l extending downward from the hub part 10 in the steering neutral state. The side spoke portion 12s extends to be inclined slightly downward from a side end of the hub part 10 toward the outside in the vehicle width direction. An end in an extension direction of each side spoke portion 12s is connected to the lateral side portion 11b of the rim part 11.

Here, each lateral side portion 11b of the rim part 11 includes: an intersection region 13 intersecting an extension end of the side spoke portion 12s; a lower extension portion 14 extending downward from the intersection region 13 and having a lower end that is connected to the lower side portion 11a; and a protrusion portion 15 protruding upward from the intersection region 13. The detailed shape of the lateral side portion 11b will be described in detail later, but the overall shape of the lateral side portion 11b is formed substantially in an arc shape in a front view.

Further, each side spoke portion 12s includes: an inflection section 16 extending along an extension direction of the side spoke portion 12s and facing the driver's side (vehicle rearward side); an upper inclination surface 17 extending upward from the inflection section 16 and curved to a vehicle forward side; and a lower inclination surface 18 extending downward from the inflection section 16 and curved to the vehicle forward side. The inflection section 16 is a section that projects most to the driver's side (vehicle rearward side) in a cross-section that intersects the extension direction of the side spoke portion 12s. In the inflection section 16, the section that projects most to the driver's side (vehicle rearward side) extends along the extension direction of the side spoke portion 12s and continues to a rear surface 13r of the intersection region 13 of the rim part 11.

In the case of the present embodiment, the inflection section 16 has a band shape having a certain degree of vertical width. However, the inflection section 16 may have a line shape having little vertical width.

The upper inclination surface 17 of the side spoke portion 12s is set such that a radius of curvature of a portion curved to the vehicle forward side is larger than a radius of curvature of a portion curved to the vehicle forward side of the lower inclination surface 18. Further, the upper inclination surface 17 includes: a main region 17a extending linearly along the extension direction of the side spoke portion 12s in the front view; and a connection region 17b extending upward from an end on the rim part 11 side of the main region 17a to be curved in a recess form. In the main region 17a, a portion close to the inflection section 16 is curved to the vehicle forward side, but a further vehicle forward side than the curved portion is formed to be substantially flat. Further, the radius of curvature of a circular arc in the front view of the connection region 17b is gradually increased toward a front side from a back side in a depth direction (from the vehicle forward side to the rearward side).

In the protrusion portion 15 projecting upward from the intersection region 13 in each lateral side portion 11b of the rim part 11, the width in the vehicle width direction is gradually increased toward an end (upper end) in the protrusion direction. Specifically, an inner end portion 15ie which is an inner end in the vehicle width direction of the protrusion portion 15 is inclined substantially at a constant angle inward in the vehicle width direction from a connection with the intersection region 13 toward an upper side. That is, the inner end portion 15ie of the protrusion portion 15 expands inward in the vehicle width direction such that the expansion width is gradually increased toward the upper side.

Further, each protrusion portion 15 protrudes upward from a position adjacent to the connection region 17b of the upper inclination surface 17 of the side spoke portion 12s. The connection region 17b of the upper inclination surface 17 is curved upward from an end on the rim part 11 side of the main region 17a of the upper inclination surface 17 and continues to the protrusion portion 15. Further, an upper end surface 15u (a surface facing upward in the steering neutral state) of each protrusion portion 15 is a substantially horizontal flat surface.

Figure 2:
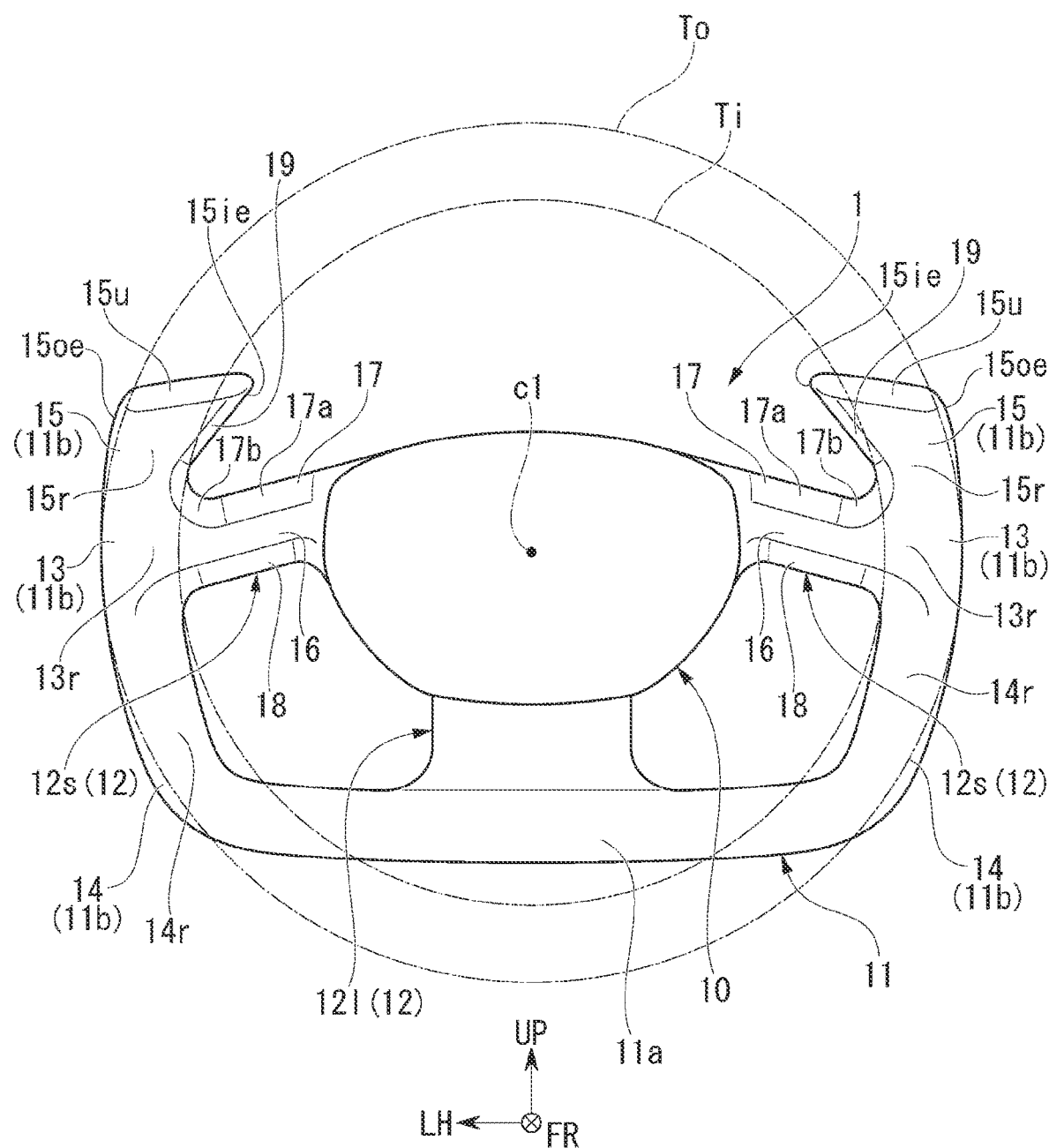
FIG. 2 is a front view of the steering wheel of the embodiment.

FIG. 2 is a front view of the steering wheel 1 in which a rotation trajectory To of an outer circumferential surface (an outer end surface in the vehicle width direction) of the intersection region 13 of the rim part 11 and a rotation trajectory Ti of an inner circumferential surface (an inner end surface in the vehicle width direction) of the intersection region 13 of the rim part 11 are added and indicated by a virtual line.

As shown in FIG. 2, part of an outer end portion 15oe of the protrusion portion 15 protruding upward from each of the right and left intersection regions 13 projects further outward than the rotation trajectory To of the outer circumferential surface of the intersection region 13 of the rim part 11. Further, part of an inner end portion 15ie of the right and left protrusion portions 15 projects further inward than the rotation trajectory Ti of the inner circumferential surface of the intersection region 13 of the rim part 11.

Further, a flat inner inclination surface 19 facing inward in the vehicle width direction and to the driver's side (vehicle rearward side) is formed in an inner region in the vehicle width direction of each protrusion portion 15. The inner inclination surface 19 smoothly continues to an upper end of the curved connection region 17b in the upper inclination surface 17 of the spoke part 12.

Further, each rear surface 13r of the right and left intersection regions 13 of the rim part 11 is formed to be substantially flush with a rear surface of the inflection section 16 of the adjacent spoke part 12. On the other hand, a rear surface 15r of the right and left protrusion portions 15 of the rim part 11 is inclined to the vehicle rearward side from the rear surface 13r of the intersection region 13 toward an upper side. Further, a front surface (not shown) of the right and left protrusion portions 15 of the rim part 11 is inclined at substantially the same angle and to the same direction as the rear surface 15r.

Further, a rear surface 14r of the lower extension portion 14 extending downward from the right and left intersection regions 13 is inclined to the vehicle rearward side from the rear surface 13r of the intersection region 13 toward a lower side.

<Gripping of Steering Wheel>

The driver seated on the driver's seat can grip the steering wheel 1 as follows.

(1) Grip Form 1

Figure 3:
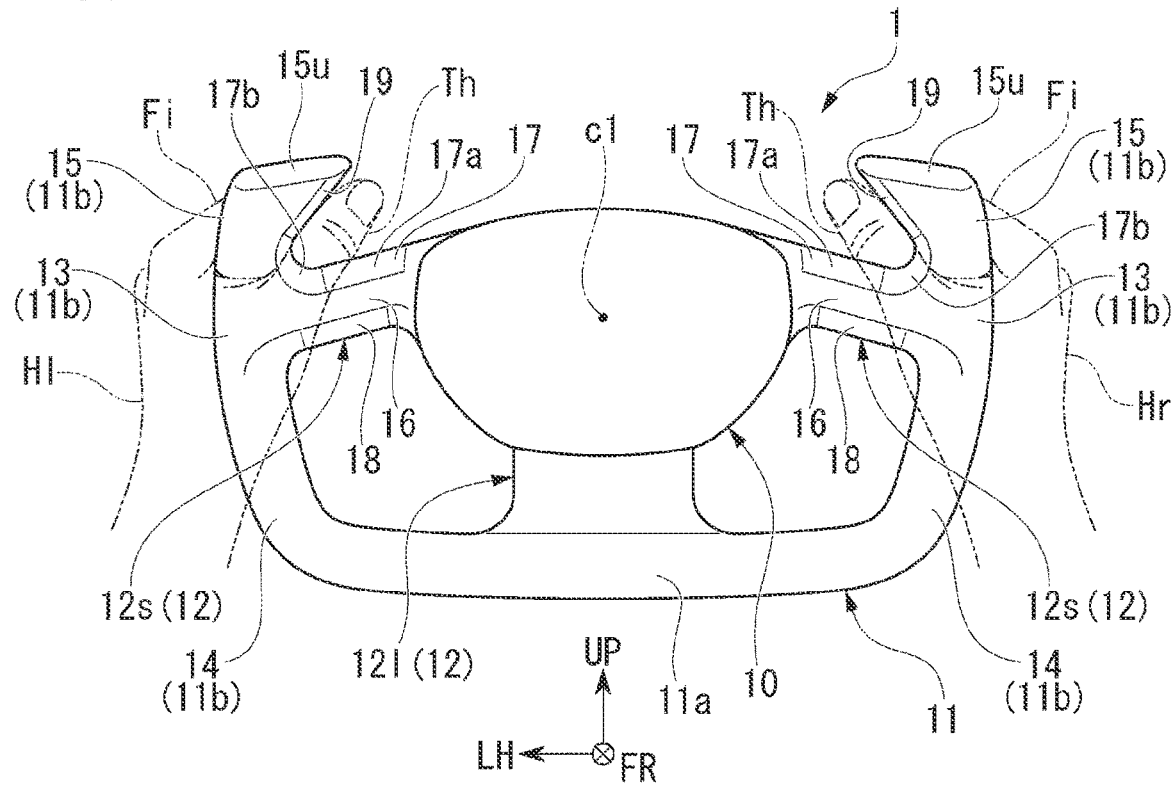
FIG. 3 is a front view showing a grip state of the steering wheel of the embodiment.

FIG. 3 is a front view showing a state in which the driver grips the steering wheel 1 in a grip form 1. In the drawing, reference numerals Hl, Hr represent the left hand and the right hand of the driver, respectively. Reference numeral Th represents the thumb of the hand. Reference numeral Fi represents a finger other than the thumb Th such as an index finger or a middle finger.

In this grip form 1, the driver presses the vicinity of the first joint and the belly of the thumb Th of the right and left hands Hr, Hl against the main region 17a and the connection region 17b of the upper inclination surface 17 of the spoke part 12, and in that state, the driver grips the outside of the intersection region 13 of the rim part 11 using the remaining fingers F. At this time, the thumb Th of the right and left hands Hr, Hl is oriented upward in a state of being inclined inward in the vehicle width direction, and the inner surface of the thumb Th is in contact with the connection region 17b of the upper inclination surface 17. Further, at this time, the fingers Fi other than the thumb Th of the right and left hands Hr, Hl grip the intersection region 13 just below the protrusion portion 15.

(2) Grip Form 2

Figure 4:
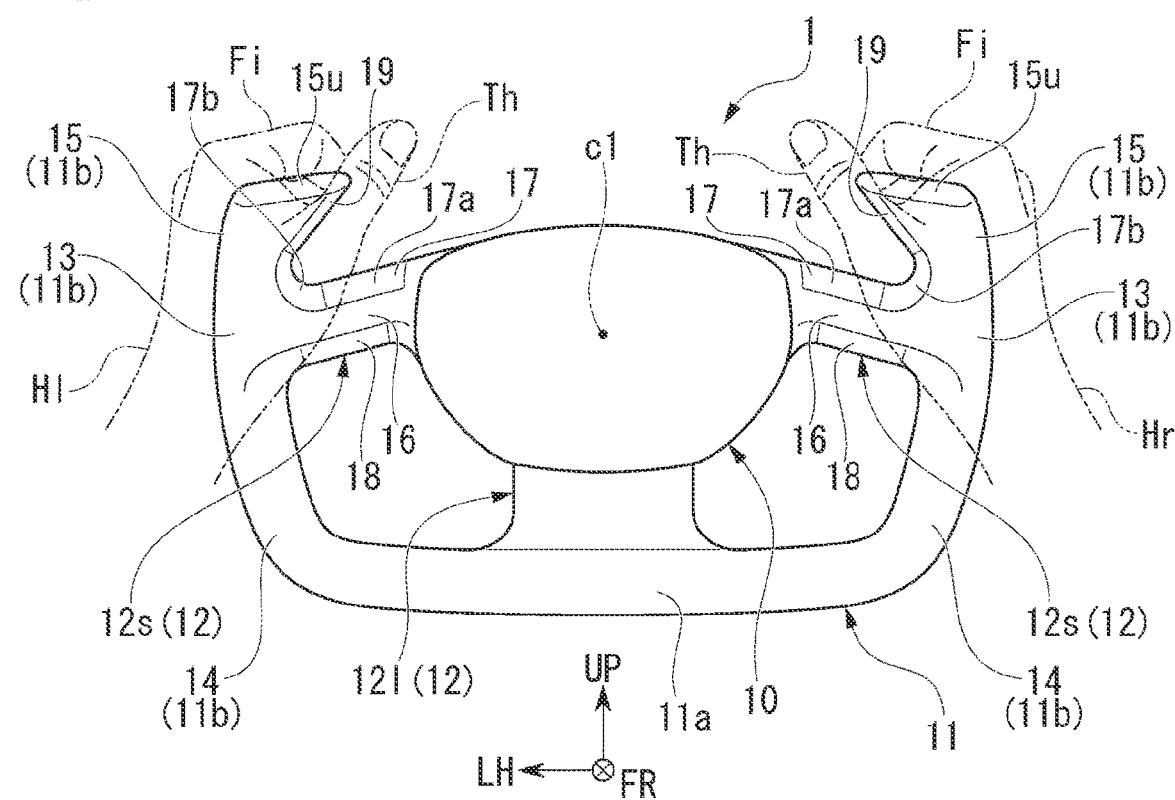
FIG. 4 is a front view showing another grip state of the steering wheel of the embodiment.

FIG. 4 is a front view showing a state in which the driver grips the steering wheel 1 in a grip form 2.

In this grip form 2, the driver directly grips the outer circumferential surface of the right and left protrusion portions 15 by the thumb Th and the fingers Fi other than the thumb Th of right and left hands Hr, Hl. At this time, the driver can hold the flat inner inclination surface 19 by the belly and the root of the thumb Th of the right and left hands Hr, Hl. Further, at this time, part of the index finger and the middle finger of the right and left hands Hr, Hl can also be placed on the flat upper end surface 15u of the right and left protrusion portions 15. Part of the vicinity of the root of the thumb Th of the right and left hands Hr, Hl can also be placed on the main region 17a or the connection region 17b of the upper inclination surface 17 of the spoke part 12.

Effects of Embodiment

As described above, in the steering wheel 1 of the present embodiment, a region of the rim part 11 that becomes an upper section in the steering neutral state is not continuous. Therefore, the rim part 11 does not block the forward sight of the driver. Accordingly, when the steering wheel 1 of the present embodiment is employed, the driver can view the display portions 2a to 2c on the instrument panel 2 and the forward direction outside the vehicle well.

Further, in the steering wheel 1 of the present embodiment, the radius of curvature of a curved portion of the upper inclination surface 17 of the side spoke portion 12s (spoke part 12) is set to be larger than the radius of curvature of a curved portion of the lower inclination surface 18. The right and left and right protrusion portions 15 of the rim part 11 protrude upward from a position adjacent to the upper inclination surface 17 (connection region 17b). Therefore, the driver can press a region of the thumb Th of the hand Hr, Hl from the root to the vicinity of a first joint against the upper inclination surface 17 of the side spoke portion 12s and, in that state, grip an outer portion of the intersection region 13 with the side spoke portion 12s of the rim part 11 by other fingers Fi (grip form 1).

Accordingly, when the steering wheel 1 of the present embodiment is employed, it becomes possible for the driver to stably grip the rim part 11 in a natural state that is not subject to an excessive force on the hand Hr, Hl.

Further, in the steering wheel 1 of the present embodiment, when the driver grips the steering wheel 1 in the state where the region of the thumb Th from the root to the vicinity of the first joint is pressed against the upper inclination surface 17 as described above, the protrusion portion 15 is located just above the gripped portion. Therefore, in this state, when the driver rotates the rim part 11 in one direction from the steering neutral state, a hand Hr or Hl at a side of pushing and rotating the rim part 11 upward is not easily displaced in the rotation operation direction.

Accordingly, when the steering wheel 1 of the present embodiment is employed, it is possible to obtain reasonable natural gripping of the rim part 11 by the driver and a good rotation operation while ensuring good forward visibility of the driver in the steering neutral state.

Further, in the steering wheel 1 of the present embodiment, the upper inclination surface 17 of the side spoke portion 12s includes: the main region 17a extending linearly along the extension direction of the side spoke portion 12s; and the connection region 17b curved upward from the end on the rim part 11 side of the main region 17a and continuing to the protrusion portion 15. Therefore, in the state where the driver presses the region of the thumb Th from the root to the vicinity of the first joint against the main region 17a of the upper inclination surface 17, the driver can simultaneously press the inner side surface of the thumb Th continuously against the curved connection region 17b. As a result, a wide region of the driver's thumb Th is stably in contact with the upper inclination surface 17.

Accordingly, when the steering wheel 1 of the present embodiment is employed, the stability of gripping of the steering wheel 1 is enhanced, and gripping feeling of the driver is also improved.

Further, in the steering wheel 1 of the present embodiment, the flat inner inclination surface 19 having at least a portion facing inward in the vehicle width direction and to the driver's side is provided in a region that becomes the inside in the vehicle width direction of each protrusion portion. Therefore, when the driver directly grips the outer circumferential surface of the protrusion portion 15, the driver can press the belly or the root of the thumb Th against the flat inner inclination surface 19. As a result, when the driver directly grips the protrusion portion 15 (grip form 2), the driver can stably grip the protrusion portion 15. Further, by pressing the belly of the thumb Th against the inner inclination surface 19, when the rim part 11 is rotated in one direction, the driver can strongly prevent the driver's hand from exiting in the rotation operation direction by the force of the thumb Th.

Specifically, in the steering wheel 1 of the present embodiment, as shown in FIG. 1 and FIG. 2, the inner end portion 15ie of the protrusion portion 15 expands inward in the vehicle width direction toward the upper side. Therefore, when the rim part 11 is rotated in one direction, the expansion portion of the inner end portion 15ie which is caught by the thumb Th can further reliably prevent the driver's hand from exiting in the rotation operation direction.

Further, in the steering wheel 1 of the present embodiment, the inner inclination surface 19 of the protrusion portion 15 smoothly continues to the curved connection region 17b of the upper inclination surface 17 of the side spoke portion 12s. Therefore, when the driver moves the grip position of the rim part 11 between the outer circumferential position of the protrusion portion 15 and the outer position of the intersection region 13, the grip position can be moved smoothly without interruption. That is, when the grip position of the rim part 11 is moved between the outer circumferential position of the protrusion portion 15 and the outer position of the intersection region 13, it is sufficient to slightly displace the pushing position of the thumb Th between the inner inclination surface 19 and the upper inclination surface 17 (connection region 17b).

Further, in the steering wheel 1 of the present embodiment, the upper end surface 15u of the protrusion portion 15 is a flat surface. Therefore, when the driver directly grips the protrusion portion 15, a portion of the driver's index finger or middle finger can be stably placed on the flat upper end surface 15u of the protrusion portion 15. In this way, when the portion of the driver's index finger or middle finger is placed on the flat upper end surface 15u of the protrusion portion 15, placement of the finger on the protrusion portion 15 is improved.

Accordingly, when the steering wheel 1 of the present embodiment is employed, the grip state when directly gripping the protrusion portion 15 can be stabilized.

Further, in the steering wheel 1 of the present embodiment, part (the outer end portion 15oe) of the outer circumferential surface of the protrusion portion 15 projects further outward than the rotation trajectory To of the outer circumferential surface of the intersection region 13 of the rim part 11. Therefore, when the driver grips the outer portion of the intersection region 13 of the rim part 11, the outer end portion 15oe of the protrusion portion 15 projecting further outward than the rotation trajectory To of the outer circumferential surface of the intersection region 13 is located at the upper side of the driver's finger other than the thumb Th (driver's index finger). Accordingly, when the driver performs the rotation operation of the steering wheel 1 in this state, the driver's finger other than the thumb Th at the side of pushing and rotating the steering wheel 1 upward is caught by the outer end portion 15oe of the protrusion portion 15, and displacement of the grip position of the driver is prevented.

When the driver places his/her thumb Th on the inside of the root of the protrusion portion 15 and, in that state, grips the outer end portion 15oe of the protrusion portion 15 with other fingers, the driver grips the rim part 11 in an unnatural wrist attitude. However, in the steering wheel 1 of the present embodiment, the driver presses the region of the thumb Th from the root to the vicinity of the first joint against the upper inclination surface 17 of the side spoke portion 12s and grips the rim part 11, and thereby, the grip position of the thumb Th faces obliquely upward and inward and is fixed. As a result, the driver's fingers other than the thumb Th naturally grips a position that is lower than the protrusion portion 15. Accordingly, the driver does not grip a section projecting outward of the outer circumferential surface of the protrusion portion 15 in an unnatural wrist attitude and does not feel uncomfortable at the time of gripping.

Further, in the steering wheel 1 of the present embodiment, part (the inner end portion 15ie) of the outer circumferential surface of the protrusion portion 15 projects further inward than the rotation trajectory Ti of the inner circumferential surface of the intersection region 13 of the rim part 11. Therefore, when the driver presses the thumb Th against the upper inclination surface 17 and grips the outer portion of the intersection region 13 of the rim part 11, the inner end portion 15ie of the protrusion portion 15 projecting further inward than the rotation trajectory Ti of the inner circumferential surface of the intersection region 13 is located at the upper side of the thumb Th. Accordingly, when the driver performs the rotation operation of the steering wheel 1 in this state, the thumb Th of the driver at a side of pushing and rotating the steering wheel 1 upward is caught by the inner end portion 15ie of the protrusion portion 15, and displacement of the grip position of the driver is prevented.

When the driver directly grips the protrusion portion 15 and performs the rotation operation of the steering wheel 1, the thumb Th of the driver at a side of pushing and rotating the steering wheel 1 upward is similarly caught by the inner end portion 15ie of the protrusion portion 15, and displacement of the grip position of the driver is prevented.

Further, in the steering wheel 1 of the present embodiment, the width in the vehicle width direction of the protrusion portion 15 widens toward an end (upper end) in a protrusion direction. Therefore, when a region of the thumb Th from the root to the vicinity of the first joint is pressed against the upper inclination surface 17 of the side spoke portion 12s, and in that state, an outer portion of the intersection region 13 of the rim part 11 is gripped by another finger, a side to which the width of the protrusion portion 15 is increased is located at the upper side of the other finger and the root of the thumb Th. At this time, since the width in the vehicle width direction of the base side of the protrusion portion 15 is relatively narrow, good gripping (stable gripping) of the rim part 11 in a state where the thumb Th is pressed against the upper inclination surface 17 is not prevented. Further, since the width of the protrusion portion 15 is increased toward the protrusion end side (upper end side), when the driver performs the rotation operation of the steering wheel 1, the upward position displacement of the driver's hand at a pushing-rotating side of the steering wheel 1 can be further reliably prevented by the protrusion portion 15.

Further, in the steering wheel 1 of the present embodiment, the side spoke portion 12s is inclined downward toward the outside in the vehicle width direction from a side end of the hub part 10. Therefore, when the driver grips the outer portion of the intersection region 13 of the rim part 11, the thumb Th can be naturally pressed against the upper inclination surface 17 (connection region 17b) of the side spoke portion 12s.

Further, even when the vertical width of the side spoke portion 12s is wide, the thumb Th can be placed at a height close to the height of a rotation center C1, and in that state, it is possible to stably grip the rim part 11. Accordingly, when the present configuration is employed, a rotation operation performance of the steering wheel 1 can be maintained well.

The present invention is not limited to the embodiments described above, and various design changes can be made without departing from the scope of the invention.

For example, the above embodiment is described using an example in which the lower side of the rim part 11 below the right and left side spoke portions 12s is formed in a substantially U shape that is laterally elongated; however, the shape of the rim part 11 below the right and left side spoke portions 12s (below the intersection region) is not limited thereto. The shape of the rim part 11 below the right and left side spoke portions 12s may be, for example, a semi-circular shape or the like. Further, the rim part may have a shape which does not include the lower side portion 11a.

Further, the above embodiment is described using an example in which, in addition to the right and left side spoke portions 12s, one lower spoke portion 12l is provided; however, the number and the shape of the lower spoke portion 12l is not limited to those of the embodiments described above. Two lower spoke portions 12l or more may be provided. The lower spoke portion 12l may not necessarily be provided.

What is claimed is:

1. A steering wheel comprising:
a rim part having a non-annular shape in which a region that becomes an upper section in a steering neutral state is not continuous; and
a spoke part extending along a direction that becomes a vehicle width direction in the steering neutral state and having an outer end in the vehicle width direction that is connected to the rim part,
wherein the spoke part comprises:
an inflection section extending along an extension direction of the spoke part and facing a driver's side;
an upper inclination surface extending toward an upper side in the steering neutral state from the inflection section and curved to a vehicle forward side; and
a lower inclination surface extending toward a lower side in the steering neutral state from the inflection section and curved to the vehicle forward side,
the upper inclination surface is set such that a radius of curvature of a portion curved to the vehicle forward side is larger than a radius of curvature of a portion curved to the vehicle forward side of the lower inclination surface,
the rim part comprises a protrusion portion protruding toward an upper side from a position adjacent to the upper inclination surface in the steering neutral state,
the protrusion portion has an inward surface in the vehicle width direction in the steering neutral state, the inward surface has an inclination that slopes inward as the inward surface extends toward an end of the protrusion portion, and
the spoke part has an upper surface in the steering neutral state, the upper surface has an inclination that slopes downwards as the upper surface approaches the protrusion portion.

2. The steering wheel according to claim 1,
wherein the upper inclination surface comprises:
a main region extending linearly along the extension direction of the spoke part in the steering neutral state; and
a connection region curved upward from an end on a rim part side of the main region in the steering neutral state and continuing to the protrusion portion.

3. The steering wheel according to claim 2,
wherein the protrusion portion comprises a flat inner inclination surface having at least a portion facing inward in the vehicle width direction and to the driver's side in a region that becomes an inside in the vehicle width direction in the steering neutral state.

4. The steering wheel according to claim 3,
wherein the inner inclination surface continues to the curved connection region of the spoke part.

5. The steering wheel according to claim 4,
wherein a surface facing upward in the steering neutral state of the protrusion portion is a flat surface.

6. The steering wheel according to claim 1,
wherein part of an outer circumferential surface of the protrusion portion projects further outward than a rotation trajectory of an outer circumferential surface of the rim part located on an extension in the extension direction of the spoke part.

7. The steering wheel according to claim 1,
wherein part of an outer circumferential surface of the protrusion portion projects further inward than a rotation trajectory of an inner circumferential surface of the rim part located on an extension in the extension direction of the spoke part.

8. A steering wheel comprising:
a rim part having a non-annular shape in which a region that becomes an upper section in a steering neutral state is not continuous; and
a spoke part extending along a direction that becomes a vehicle width direction in the steering neutral state and having an outer end in the vehicle width direction that is connected to the rim part,
wherein the spoke part comprises:
an inflection section extending along an extension direction of the spoke part and facing a driver's side;
an upper inclination surface extending toward an upper side in the steering neutral state from the inflection section and curved to a vehicle forward side; and
a lower inclination surface extending toward a lower side in the steering neutral state from the inflection section and curved to the vehicle forward side,
the upper inclination surface is set such that a radius of curvature of a portion curved to the vehicle forward side is larger than a radius of curvature of a portion curved to the vehicle forward side of the lower inclination surface,
the rim part comprises a protrusion portion protruding toward an upper side from a position adjacent to the upper inclination surface in the steering neutral state,
the protrusion portion has an inward surface in the vehicle width direction in the steering neutral state, the inward surface has an inclination that slopes inward as the inward surface extends toward an end of the protrusion portion, and
wherein in the protrusion portion, a width in the vehicle width direction in the steering neutral state widens toward an end in a protrusion direction.

* * * * *